United States Patent [19]
Shigemoto

[11] Patent Number: 6,000,422
[45] Date of Patent: Dec. 14, 1999

[54] FLUID DEVICE WITH DOUBLE CONTAINMENT

[75] Inventor: Hiromi Dick Shigemoto, Round Rock, Tex.

[73] Assignee: Shigemoto & Annette II, Inc., Elgin, Tex.

[21] Appl. No.: 08/853,346

[22] Filed: May 8, 1997

[51] Int. Cl.⁶ ............................................. E03B 7/00
[52] U.S. Cl. ............................................. 137/312; 137/884
[58] Field of Search ................................ 137/312, 884, 137/313, 314, 861, 7

[56] References Cited

U.S. PATENT DOCUMENTS

| | | |
|---|---|---|
| 1,715,854 | 6/1929 | McKenzie-Martyn . |
| 2,407,076 | 9/1946 | Harkness . |
| 3,567,258 | 3/1971 | Scaramucci . |
| 3,603,346 | 9/1971 | Hirt ........................................ 137/884 |
| 3,672,207 | 6/1972 | Cramp et al. . |
| 3,750,707 | 8/1973 | Dordoni . |
| 4,019,371 | 4/1977 | Chaplin et al. . |
| 4,372,565 | 2/1983 | Lien . |
| 4,537,217 | 8/1985 | Allen, Jr. . |
| 4,848,722 | 7/1989 | Webster ................................. 137/884 |
| 5,090,871 | 2/1992 | Story et al. . |
| 5,170,659 | 12/1992 | Kemp . |
| 5,176,359 | 1/1993 | Leveson et al. ....................... 137/884 |
| 5,197,766 | 3/1993 | Glover et al. . |
| 5,316,955 | 5/1994 | Govorchin . |
| 5,368,648 | 11/1994 | Sekizuka . |
| 5,419,360 | 5/1995 | Lechevalier . |
| 5,487,409 | 1/1996 | Stoll et al. . |
| 5,494,071 | 2/1996 | Bell et al. . |
| 5,803,124 | 9/1998 | Newton et al. ........................ 137/884 |

*Primary Examiner*—David J. Walczak
*Attorney, Agent, or Firm*—Fitzpatrick, Cella, Harper & Scinto

[57] ABSTRACT

A fluid-handling device includes first and second mating plates. The first plate includes a central groove and a secondary groove surrounding the central groove. The second plate includes a complementary central groove that forms a main bore with the central groove of the first plate. A first seal disposed between the first and second plates seals between the main bore and the secondary groove. A second seal is disposed between the plates and surrounding the first seal. A vacuum communicates between the secondary groove to draw away fluid that may leak from the main bore past the first seal. The forces in the secondary groove due to the vacuum aid in securing the second plate to the first plate. A sensor can be tapped into the vacuum line to immediately sense whether any fluid has leaked past the first seal.

29 Claims, 6 Drawing Sheets

FLUID DEVICE WITH DOUBLE CONTAINMENT

BACKGROUND OF THE INVENTION

1. Field of the Invention

The present invention relates generally to a fluid-containing, conducting or distributing device that effectively prevents any leakage. More particularly, the present invention relates to a junction assembly with double-containment and immediate detection of seal failure or leakage.

2. Brief Description of the Prior Art

In the semiconductor manufacturing industry, many hazardous fluids are used and must be carefully handled to prevent damage to equipment and injury to both the environment and production employees. Furthermore, these fluids must be kept as pure as possible during all aspects of the handling and supply, since any contact of the flow stream with a contaminant may result in defects in the manufactured products. These defects are usually not detected until after the manufacturing operation has been completed.

During the manufacturing process, certain fluids must be distributed to various locations in precise amounts. To this end, the industry has used gas panels, which comprise bases on which a plurality of valves and mask flow controllers are mounted. The fluid flows through and among these devices by way of external conduits. However, these external conduits require numerous junctions, which means further opportunities for leakage. Moreover, in order to ensure proper flow through the system, the internal bores of these conduits must have an extremely smooth surface without any pits or protrusions. Any of these defects may act as a barrier to retain some of the fluid within the system, even if the system is purged. To ensure the smoothness of the internal bore, the bores normally are electro-polished and then visibly inspected with an endoscope to confirm the smoothness. This leads to an increase in cost of the gas panels.

Fluid passages have been bored in metal plates, which can resolve the problem of fluid leaking through the walls of the bores. However, the shapes of the bores are generally limited to configurations that can be machined into the plate, i.e., straight bores. Further, even if these bores are polished, they also must be inspected with an endoscope, which leads to an increase in the cost.

SUMMARY OF THE PRESENT INVENTION

It is therefore a principal object of the present invention to provide a fluid-containing, conducting or distributing device having double-containment sealing to prevent leakage or contamination of the fluid in the event of seal failure.

Another object of the present invention is to provide such a device including a detector for detecting leakage of the fluid past the first containment means.

Yet another object of the present invention is to provide such a fluid-containing, conducting or distributing device that is formed by two or more complementary plates.

In one aspect of the present invention a fluid device includes first and second plates, a seal and vacuum means. The first plate includes a central groove and a secondary groove surrounding the central groove. The second plate includes a complementary central groove, configured so that the central groove of the first plate and the complementary central groove of the second plate form a main bore. The seal is disposed between the first plate and the second plate for sealing between the main bore and the secondary groove. The vacuum means communicates with the secondary groove to create a vacuum in the secondary groove to draw away any fluid that may leak from the main bore past the seal and to aid in securing the second plate to the first plate.

In a further aspect of the present invention a fluid device includes first and second plates and a seal. The first plate includes a central groove and a secondary groove surrounding the central groove. The second plate includes a complementary central groove, configured so that the central groove of the first plate and the complementary central groove of the second plate form a main bore. The seal is disposed between the first plate and the second plate for sealing between the main bore and the secondary groove. The secondary groove is formed adjacent the central groove, and an edge between the central groove and the secondary groove is so located as to press against the seal. The secondary groove defines a chamber for receiving any fluid leaking from the main bore past the seal.

In yet a further aspect of the present invention a manifold includes first and second plates and a seal. The first plate includes a central groove and a secondary groove surrounding the central groove. The second plate includes a complementary central groove, again configured so that the central groove of the first plate and the complementary central groove of the second plate forming a main bore. The seal is disposed between the first plate and the second plate. An inner edge of the secondary groove defines a first sealing edge, and an outer edge of the secondary groove defines a second sealing edge. The first sealing edge and the second sealing edge both press against the seal.

These and other objects, advantages and features of the present invention will become more apparent to those skilled in the art when the following detailed description is read in conjunction with the accompanying drawings.

BRIEF DESCRIPTION OF THE DRAWINGS

In the following detailed description, reference will be made to the attached drawings in which.

DETAILED DESCRIPTION OF THE PREFERRED EMBODIMENTS

Figure 1:
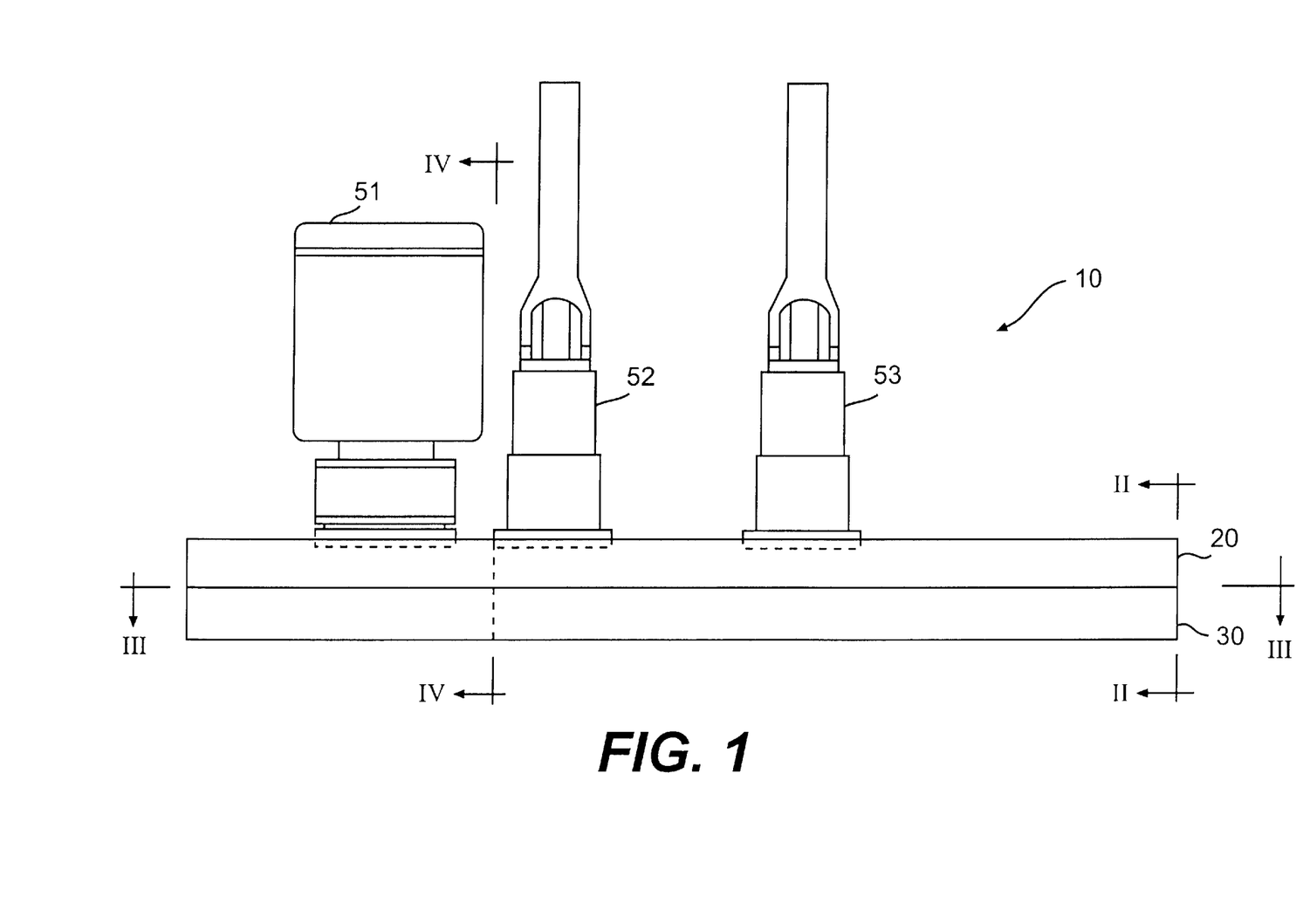
FIG. 1 is a front plan view of a gas manifold according to the present invention.
Figure 2:
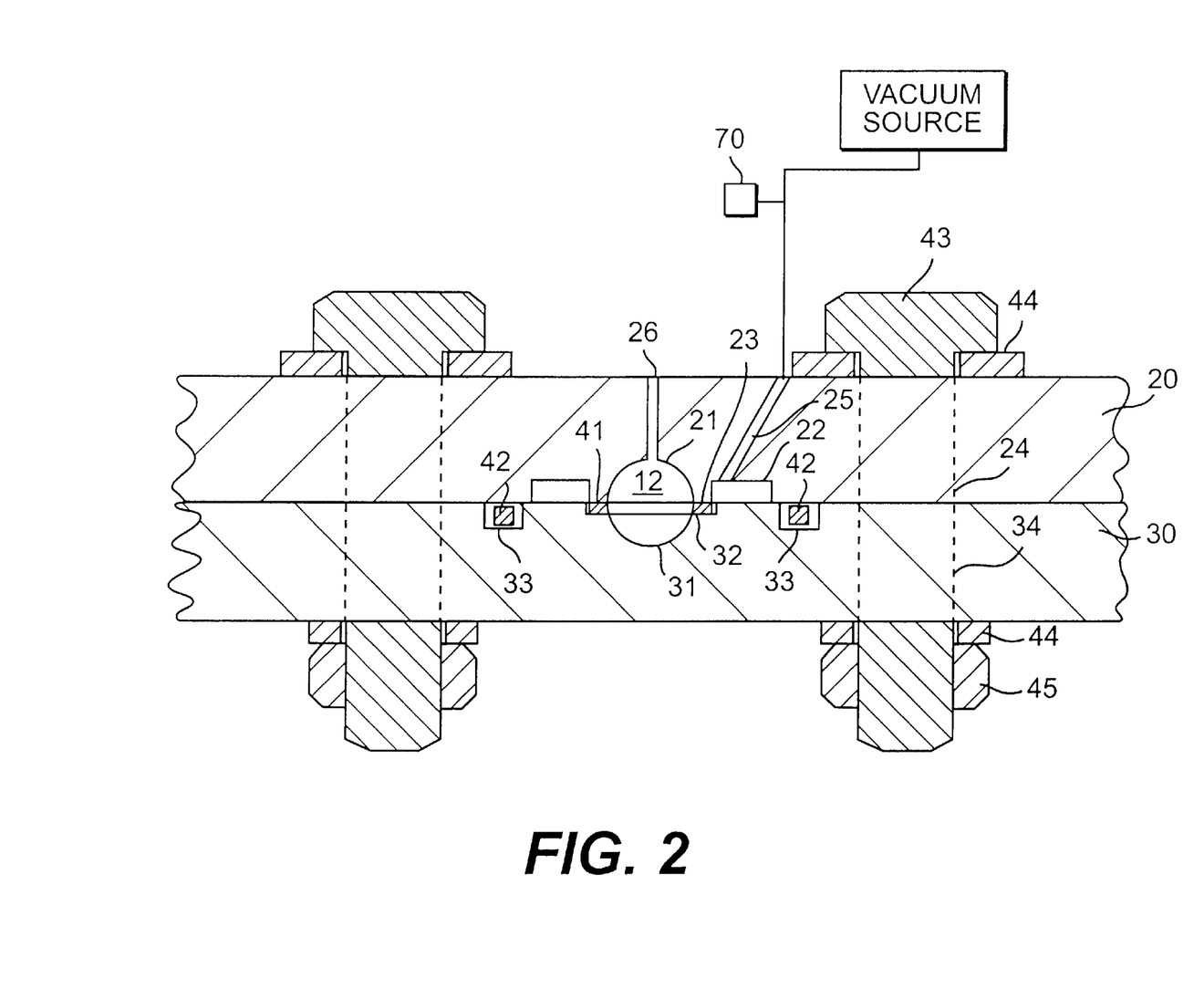
FIG. 2 is a sectional view along section line II—II of FIG. 1.

FIG. 1 depicts a front plan view of a gas or fluid manifold 10 as a fluid device according to the present invention. The manifold is formed primarily of a first plate 20 and a second, complementary plate 30. These plates can be formed of stainless steel, for example. Referring now to FIG. 2, which is a cross-section along section line II—II of FIG. 1, a more detailed description of the plates 20, 30 will be given.

The first plate 20 is formed with a main groove 21, which will form a portion of the fluid chamber or passage. Surrounding the main groove 21 is a secondary groove 22. The secondary groove 22 is continuous and can be in any closed shape, such as an oval. A passage 25 is formed in first plate 20 to communicate secondary groove 22 with the exterior of the first plate 20. Between main groove 21 and secondary groove 22 is formed a sealing edge 23. This sealing edge 23 can be tapered to a desired degree by flaring of the edges of the main groove 21 or the inner edges of the secondary groove 22. A plurality of through-holes 24 are formed throughout the first plate 20.

The second plate 30 is formed with a complementary main groove 31. When plates 20 and 30 are mated together, main groove 21 and complementary main groove 31 are aligned to form a main bore 12. Surrounding the complementary main groove 31 is a countersunk recess 32, which is disposed opposite the sealing edge 23 when the first and second plates are mated together. Surrounding the recess 32 is another secondary groove 33. This secondary groove 33 can also be oval in shape and is disposed radially outward of the secondary groove 22 when the plates 20 and 30 are mated together. A plurality of through-holes 34, which align with through-holes 24 when the plates 20, 30 are mated, are formed throughout the second plate 30. Inlet and outlet communicating passages 26, 27 are formed in the first plate 20 to communicate with opposite ends of main groove 21. Alternately, these passages can be formed in the second plate 30 to communicate with complementary main groove 31.

The main and secondary grooves in plates 20 and 30 can be formed in any known manner. For example, the grooves can be defined by the molds and formed when the plates are cast, or they can be machined into existing plates.

The main bore 12 is preferably circular in cross-section and its diameter can range from 0.040 to 0.80 in. Passage 25 is also preferably circular in cross-section and its diameter can range from 0.030 to 0.150 in. The secondary grooves 22 and 33 can have either a rounded or square cross-section, the cross-sectional area of which preferably ranges from 0.0009 to 0.25 in$^2$.

Prior to mating plates 20 and 30, a first seal 41 is placed in recess 32 and a second seal 42 is placed in the secondary recess 33 of the second plate 30. These seals can be formed of any desired material, but are preferably formed of stainless steel. The seals are generally in the shapes of their respective receptacles, e.g., an oval or a racetrack shape. The cross-sectional shape of the seals are also generally similar to that of their respective receptacles, e.g., rounded or square. The seals should be dimensioned such that they are flush or slightly protrude beyond the surface of the second plate 30, preferably in a range from 0.00 to 0.020 in.

In an alternative embodiment, the seals 41 and 42 need not be elements separate from the plates 20 and 30. For example, seals 41 and 42 can be formed by annealing sections of plate 30. In this way sealing edge 23 can press against the annealed sealing section of plate 30 to effectively form a sealing surface. In this alternative embodiment, since the seals 41, 42 are integrally formed in the second plate 30, recess 32 and secondary recess 33 would be omitted.

After the seals are positioned, plates 20 and 30 are mated together and bolted by a plurality of bolts 43, washers 44 and nuts 45, the bolts being inserted in aligned through-holes 24, 34. As the bolts are tightened, sealing edge 23 compresses against seal 41 and the inner surface of plate 20 is compressed against seal 42. The passage 25 is connected to a vacuum, which aids in holding the plates together and can concentrate this holding force in a region that surrounds and is proximate to the seal 41 and sealing edge 23. A sensor 70, such as a hydrogen mass spectrometer, can be placed in line between passage 25 and the vacuum source to sense as soon as possible when any fluid has leaked past the first seal 41.

Figure 3:
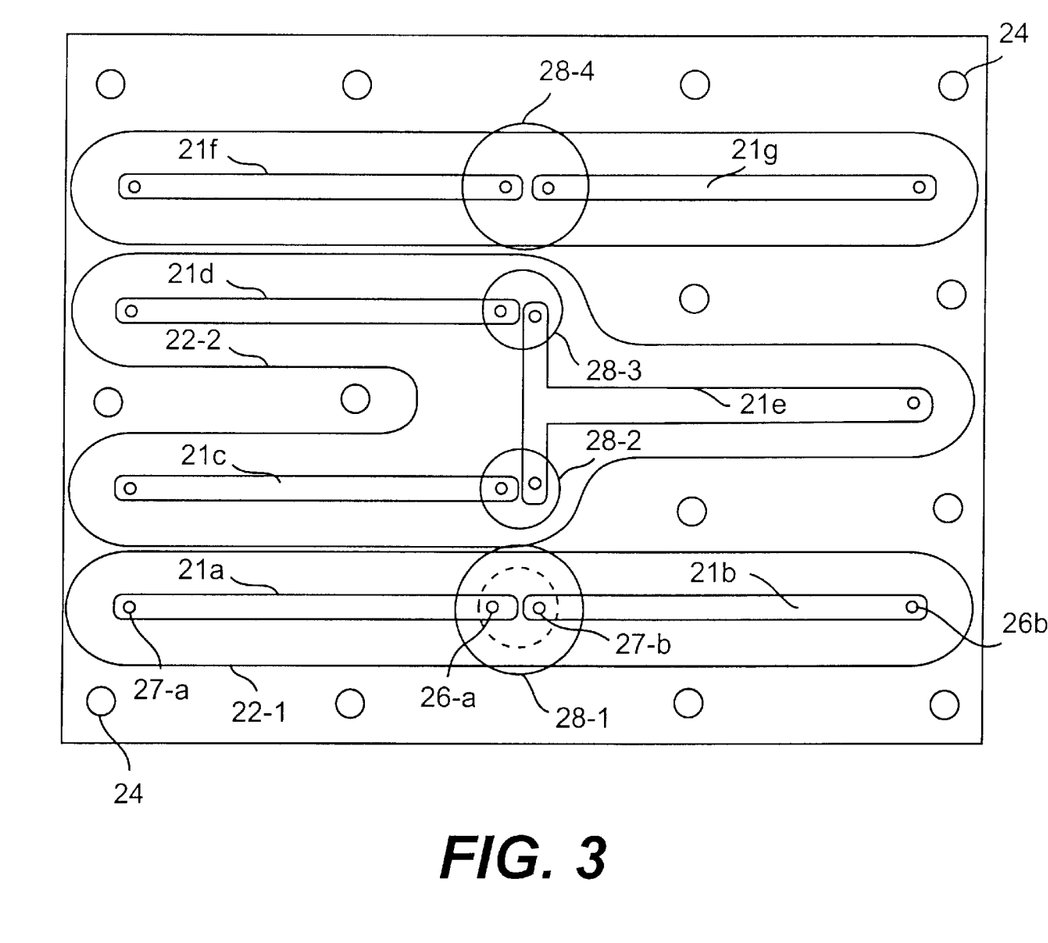
FIG. 3 is a sectional view of the manifold along section line III—III of FIG. 1.

Thus, one main bore 12 is formed. However, in the manifold of the present invention, a plurality of intercommunicating main bores are formed between the first and second plates 20, 30. As shown in FIG. 3, which is a plan view of the top plate 20, a plurality of main bores 21a–21g are formed. As FIG. 3 shows, when two linear main grooves 21a and 21b are aligned, rather than forming a secondary groove around each main groove, a single secondary groove 22-1 can be formed to surround both main grooves. Likewise, when two parallel main grooves 21c, 21d are formed to communicate with a T-shaped main groove 21e, a single Y-shaped secondary groove 22-2 can be formed. It will be appreciated that regardless of the shape of the secondary grooves 22, no through-holes 24 should be formed inside the area circumscribed by any of the secondary grooves. For example, note the two through-holes 24 positioned between main grooves 21c and 21d.

Figure 4:
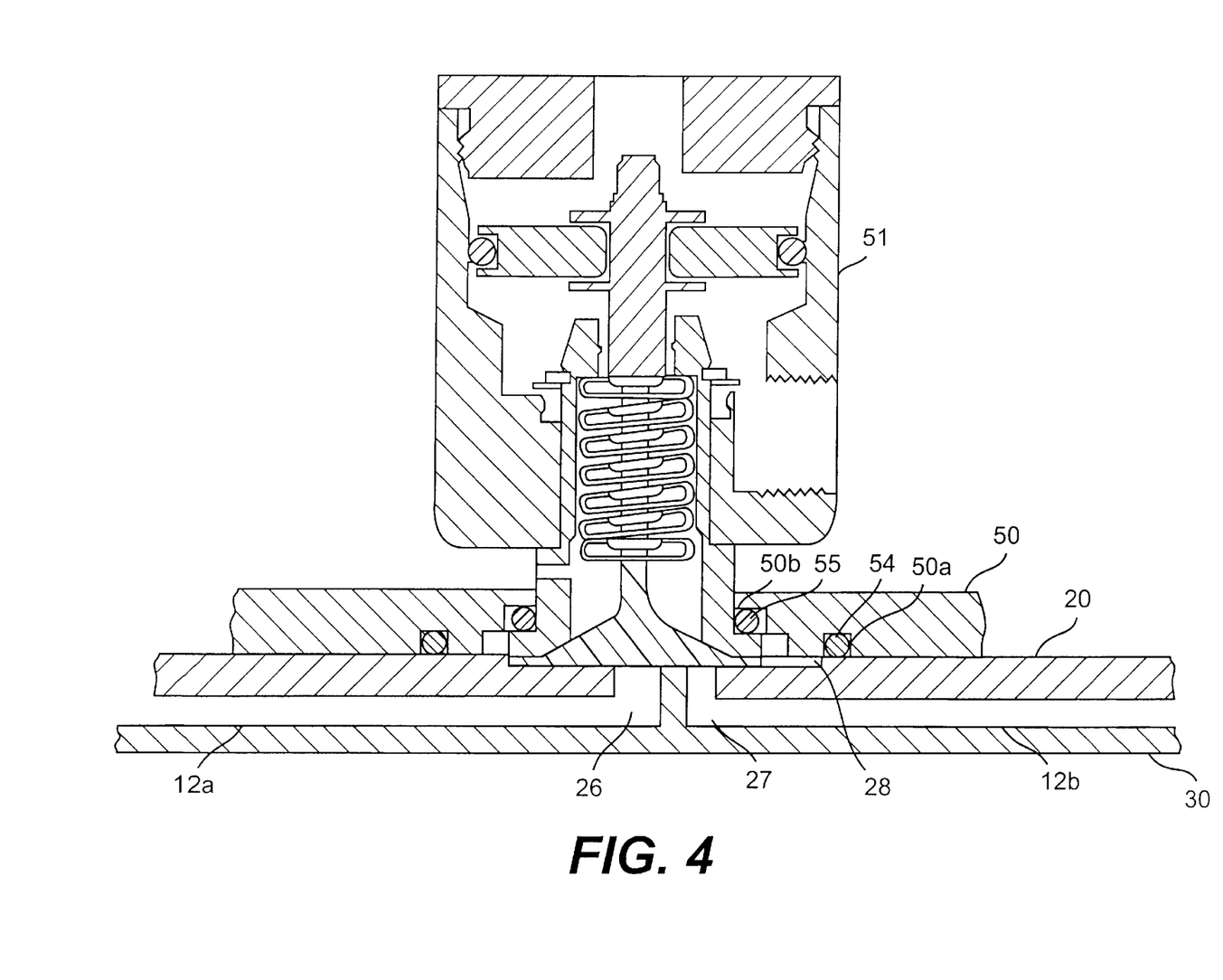
FIG. 4 is a sectional view along section line IV—IV of FIG. 1.

To communicate between main bores 12 by way of communicating inlet and outlet passages 26, 27 a series of valves 51–53 or mass flow controllers can be secured to the first plate 20. Referring to FIG. 4, which is a cross-section through section line IV—IV in FIG. 1, the valve 51 is positioned in a valve seat recess 28 formed in the exterior surface of first plate 20. A retaining plate 50 secures the valve 51 to the first plate 20. This retaining plate 50 can be bolted to the first plate 20. The valve seat recess 28 surrounds an inlet passage 26 and an outlet passage 27 of two main bores 12 that are intended to connect. For example, recess 28 surrounds communicating bores 26 and 27 of main bores 12a and 12b, respectively. Thus, the valve 51 can control fluid passage from bore 12a to bore 12b.

The valve 51 can be of any conventional design, and it can be manually actuated, such as a toggle valve, or it can be fluid or electrically actuated. Keeping with the desire to maintain a smooth flow path to prevent retention of residual fluid, the valves will preferably have a low internal volume and a fully-swept flow path for effective purging. Also, they preferably will utilize metal diaphragms and have electro-polished internal surfaces. Valves or mass flow controllers can be placed at every junction between adjacent communicating passages 26, 27.

In order to prevent leakage of the fluid at the valve site, a first seal or O-ring 54 is placed in a groove 50a to seal between retaining plate 50 and first plate 20, and a second seal or O-ring 55 is fitted in a groove between a flange 50b of the retaining plate 50 and a flange of the valve.

Because the fluid passages of the manifold are formed of two complementary plate halves, electro-polishing of the surfaces of the flow passages can be visually inspected directly, before the plates are assembled. Also, complex shapes of the main bores 12, such as a T-shape, can be formed due to this two-plate construction. These features are generally unattainable if the manifold is formed by flow passages bored in a single plate.

Figure 5:
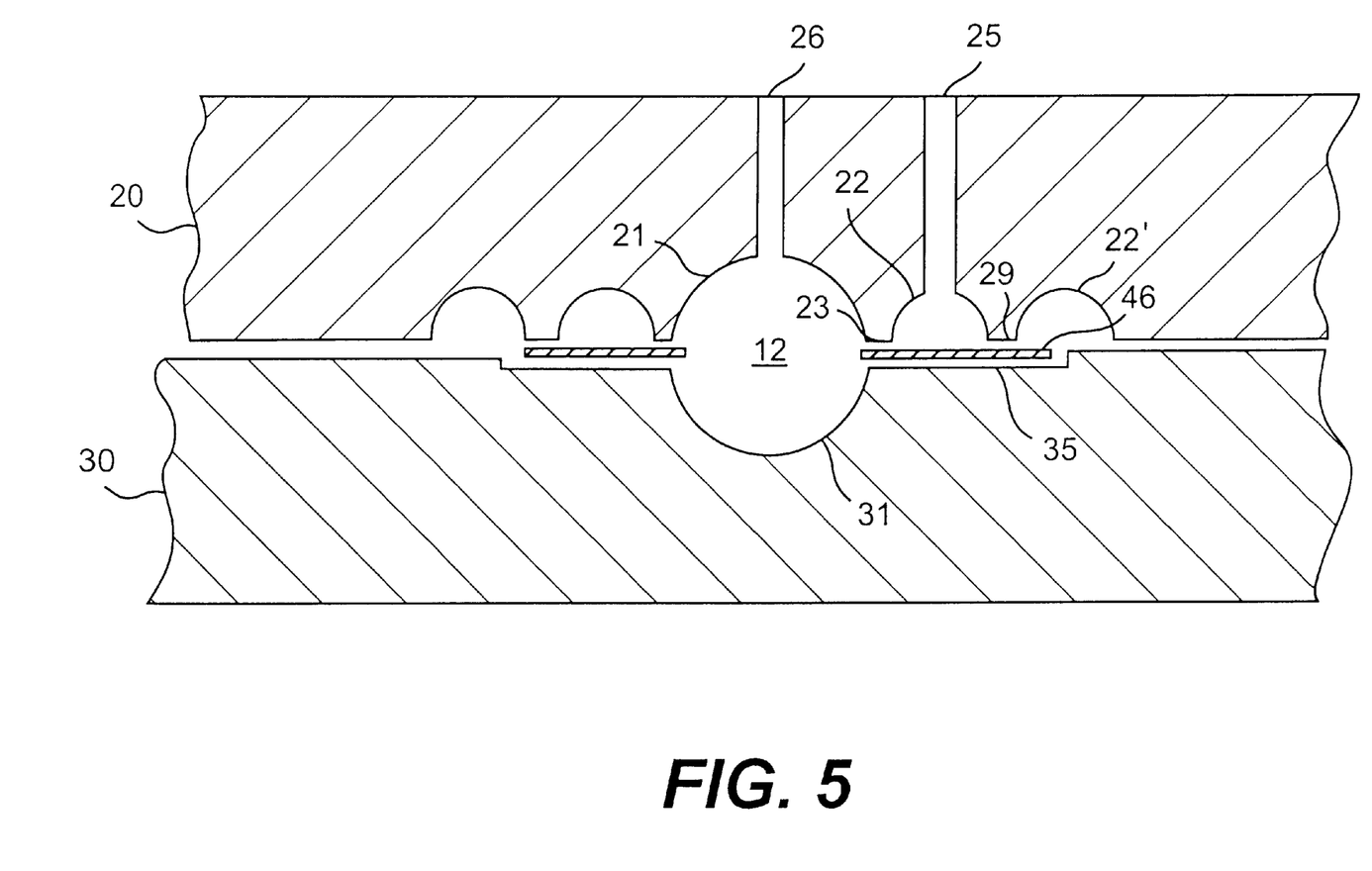
FIG. 5 is a sectional view of a second embodiment of the present invention.

In a second embodiment, as shown in FIG. 5, a single seal 46 is used in place of seals 41, 42. In comparing FIG. 5 to FIG. 2, like reference numerals indicate similar elements. Thus, in the first plate of the second embodiment, main groove 21, secondary groove 22, sealing edge 23, vacuum bore 25 and communicating passages 26, 27 are similar to those in the first embodiment. In second plate 30 complementary main groove 31 is similar to that of the first embodiment. However, adjacent and outward of the secondary groove 22 in the first plate 20 is formed a third groove 22'. This forms a second sealing edge 29 outwardly of the first sealing edge 23. The taper of this second sealing edge 29 can be determined by the flaring of the outer edge of the secondary groove 22 or the inner edge of third groove 22'. The second plate 30 is formed with a wider recess 35 surrounding the complementary main groove 31. The single seal 46, which can be formed of stainless steel, for example, sits in the recess 35. When the first and second plates 20, 30 are mated and bolted together, sealing edges 23 and 29 seal against the seal 46 at two locations. Thus, the second embodiment functions similarly to the first embodiment, in that any fluid that leaks from the main bore 12 past the first sealing edge 23 can be drawn off from the secondary groove 22 through the passage 25 and be immediately detected by sensor 70. The second sealing edge 29 can contain any leaks past the first sealing edge 23.

Figure 6:
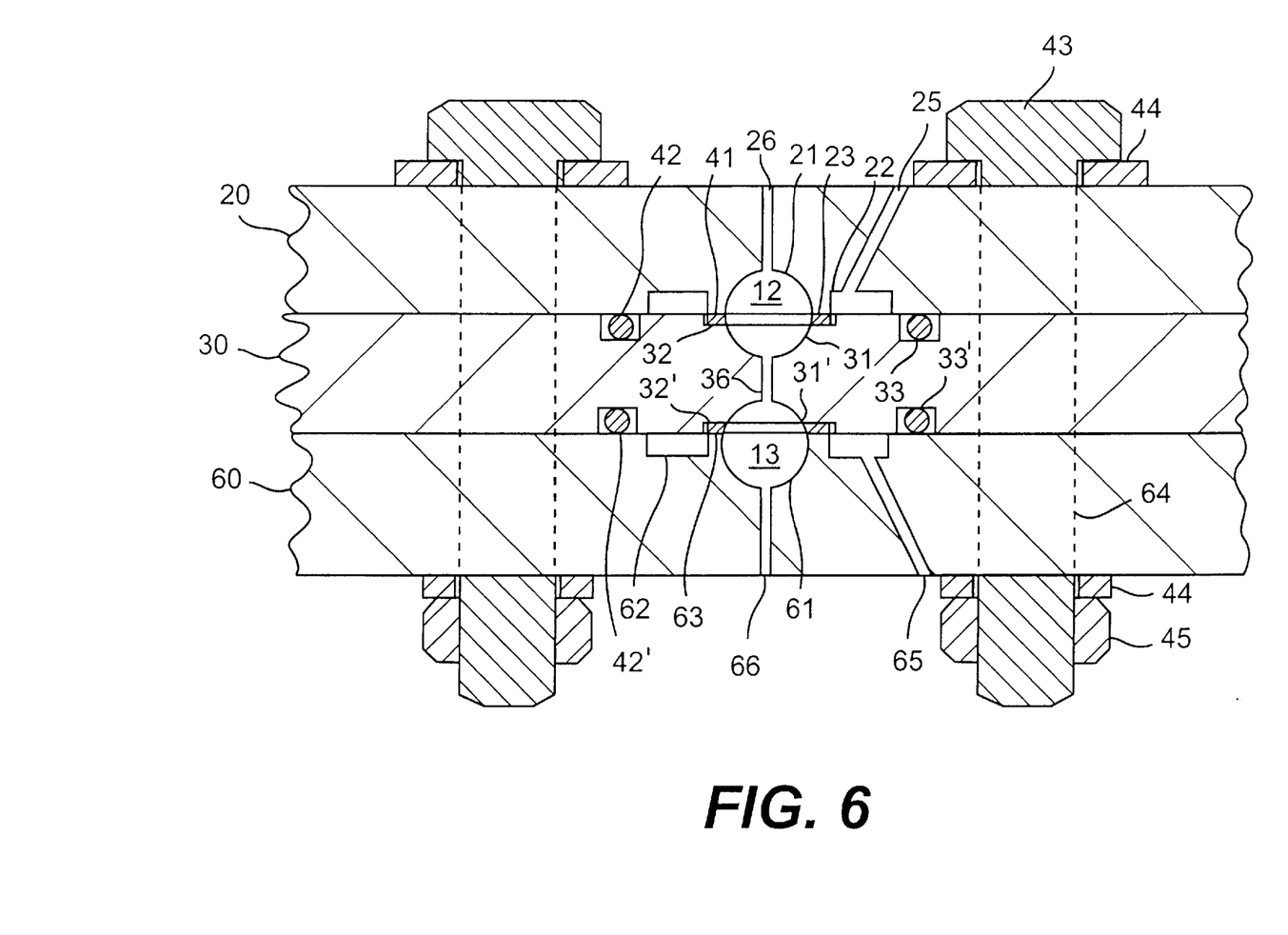
FIG. 6 is a sectional view of a third embodiment of the present invention.

In yet another embodiment, plural tiers of communicating passages can be formed by utilizing three or more plates. For example, as shown in FIG. 6, a third plate 60 is mated with a second plate 30 on a surface opposite the first plate 20. In this third embodiment, the first plate 20 is formed similarly to that in the first embodiment. However, although the grooves in the second plate that mate with the first plate are the same as in the first embodiment, the opposite surface of the second plate is a mirror image of the surface that mates with the first plate. That is, the second plate 30 also includes a second complementary main groove 31', a second sealing recess 32' and another sealing seat groove 33'. Further, the third plate 60 is formed as a mirror image of the first plate 20. That is, the third plate 60 includes a main groove 61, a secondary groove 62, a sealing edge 63, a through-bore 64, a vacuum passage 65, and communicating passages 66. In addition, the second plate includes an interbore communicating passage 36.

When the first, second and third plates 20, 30, 60 are mated and bolted together, two tiers of main bores 12, 13 are formed, with the interbore communicating passage 36 communicating between the two levels of bores.

Although the present invention has been described above in terms of preferred embodiments for use in a fluid manifold, it will be appreciated that the invention can be incorporated in any fluid-containing, conveying or distributing device.

While preferred embodiments of the present invention have been illustrated in detail, it is apparent that modifications and adaptations of the preferred embodiments will occur to those skilled in the art. However, it will be expressly understood that such modifications and adaptations are within the spirit and scope of the present invention as set forth in the following claims.

We claim:

1. A fluid-handling device comprising:
    a first plate comprising a central groove and a secondary groove surrounding said central groove;
    a second plate adjacent said first plate, said second plate comprising a complementary central groove, said central groove of said first plate and said complementary central groove of said second plate forming a main bore for conveyance of a fluid;
    a seal between said first plate and said second plate for sealing between said main bore and said secondary groove; and
    vacuum means communicating with said secondary groove for creating a vacuum in said secondary groove to draw away any fluid that may leak from said main bore past said seal and to aid in securing said second plate to said first plate.

2. A fluid-handling device according to claim 1, wherein said first plate and said second plate are bolted together.

3. A fluid-handling device according to claim 1, wherein said main bore is linear and said secondary groove and said seal are oval in shape and surround said main bore.

4. A fluid-handling device according to claim 1, wherein said vacuum means is further connected to a sensor for sensing whether any fluid has leaked past said seal.

5. A fluid-handling device according to claim 1, further comprising valve means, wherein said first plate comprises plural central grooves and secondary grooves and said second plate comprises plural complementary central grooves to form plural main bores, and said valve means selectively controls fluid flow between said plural main bores.

6. A fluid-handling device according to claim 1, further comprising a third plate having a central groove and a secondary groove surrounding said central groove, wherein said second plate is formed with complementary central grooves on both faces, and said complementary central groove on a face abutting said third plate forms another main bore with said central groove of said third plate.

7. A fluid-handling device according to claim 6, wherein a communicating passage is formed in said second plate between said main bore formed between said first and second plates and said main bore formed between said second and third plates.

8. A fluid-handling device according to claim 1, wherein said seal comprises an annealed section of at least one of said first plate and said second plate.

9. A fluid-handling device comprising:
    a first plate comprising a central groove and a secondary groove surrounding said central groove;
    a second plate adjacent said first plate, said second plate comprising a complementary central groove, said central groove of said first plate and said complementary central groove of said second plate forming a main bore for conveyance of a fluid; and
    a seal between said first plate and said second plate for sealing between said main bore and said secondary groove, wherein said secondary groove is formed adjacent said central groove and an edge between said central groove and said secondary groove forms an edge for pressing against said seal, said secondary groove defining a chamber for receiving any fluid leaking from said main bore past said seal.

10. A fluid-handling device according to claim 9, wherein said secondary groove communicates with a vacuum source for drawing off any fluid that leaks from said main bore past said seal.

11. A fluid-handling device according to claim 10, wherein a vacuum created in said secondary groove aids in securing said second plate to said first plate.

12. A fluid-handling device according to claim 10, wherein said vacuum source is further connected to a sensor for sensing whether any fluid has leaked past said seal.

13. A fluid-handling device according to claim 9, wherein said first plate and said second plate are bolted together.

14. A fluid-handling device according to claim 9, wherein said main bore is linear and said secondary groove and said seal are oval in shape and surround said main bore.

15. A fluid-handling device according to claim 9, further comprising valve means, wherein said first plate comprises plural central grooves and secondary grooves and said second plate comprises plural complementary central grooves to form plural main bores, and said valve means selectively controls fluid flow between said plural main bores.

16. A fluid-handling device according to claim 9, further comprising a third plate having a central groove and a secondary groove surrounding said central groove, wherein said second plate is formed with complementary central grooves on both faces, and said complementary central groove on a face abutting said third plate forms another main bore with said central groove of said third plate.

17. A fluid-handling device according to claim 16, wherein a communicating passage is formed in said second plate between said main bore formed between said first and second plates and said main bore formed between said second and third plates.

18. A fluid-handling device according to claim 9, wherein said seal comprises an annealed section of said second plate.

19. A fluid-handling device comprising:

a first plate comprising a central groove and a secondary groove surrounding said central groove;

a second plate adjacent said first plate, said second plate comprising a complementary central groove, said central groove of said first plate and said complementary central groove of said second plate forming a main bore for conveyance of a fluid; and a seal between said first plate and said second plate, wherein an inner edge of said secondary groove defines a first sealing edge and an outer edge of said secondary groove defines a second sealing edge, and said first sealing edge and said second sealing edge press against said seal.

20. A fluid-handling device according to claim 19, wherein a recess is formed in said second plate surrounding said complementary central groove to define a seat for said seal.

21. A fluid-handling device according to claim 19, wherein said first plate further comprises a third groove surrounding said secondary groove and said second sealing edge is defined between the outer edge of said secondary groove and an inner edge of said third groove.

22. A fluid-handling device according to claim 19, wherein said first plate and said second plate are bolted together.

23. A fluid-handling device according to claim 19, wherein said main bore is linear and said secondary groove and said seal are oval in shape and surround said main bore.

24. A fluid-handling device according to claim 19, further comprising vacuum means communicating with said secondary groove for creating a vacuum in said secondary groove to draw away any fluid that may leak from said main bore past said seal and to aid in securing said second plate to said first plate.

25. A fluid-handling device according to claim 24, wherein said vacuum means is further connected to a sensor for sensing whether any fluid has leaked past said seal.

26. A fluid-handling device according to claim 19, further comprising valve means, wherein said first plate comprises plural central grooves and secondary grooves and said second plate comprises plural complementary central grooves to form plural main bores, and said valve means selectively controls fluid flow between said plural main bores.

27. A fluid-handling device according to claim 19, further comprising a third plate having a central groove and a secondary groove surrounding said central groove, wherein said second plate is formed with complementary central grooves on both faces, and said complementary central groove on a face abutting said third plate forms another main bore with said central groove of said third plate.

28. A fluid-handling device according to claim 27, wherein a communicating passage is formed in said second plate between said main bore formed between said first and second plates and said main bore formed between said second and third plates.

29. A fluid-handling device according to claim 19, wherein said seal comprises an annealed section of said second plate.

\* \* \* \* \*